(12) United States Patent
Zheng et al.

(10) Patent No.: US 11,781,535 B2
(45) Date of Patent: Oct. 10, 2023

(54) COOLING STRUCTURE OF HEAT PIPE FOR SUPERCONDUCTING MAGNETO PLASMA DYNAMIC THRUSTER

(71) Applicant: HEFEI INSTITUTES OF PHYSICAL SCIENCE, CHINESE ACADEMY OF SCIENCES, Hefei (CN)

(72) Inventors: Jinxing Zheng, Hefei (CN); Mingzhun Lei, Hefei (CN); Pinghui Zhao, Hefei (CN); Zhou Yin, Hefei (CN); Haiyang Liu, Hefei (CN); Ming Li, Hefei (CN); Fei Liu, Hefei (CN); Cheng Zhou, Hefei (CN); Ge Wang, Hefei (CN)

(73) Assignee: HEFEI INSTITUTES OF PHYSICAL SCIENCE, CHINESE ACADEMY OF SCIENCES, Hefei (CN)

( * ) Notice: Subject to any disclaimer, the term of this patent is extended or adjusted under 35 U.S.C. 154(b) by 0 days.

(21) Appl. No.: 17/993,870

(22) Filed: Nov. 23, 2022

(65) Prior Publication Data
US 2023/0167812 A1 Jun. 1, 2023

(30) Foreign Application Priority Data
Nov. 29, 2021 (CN) .......................... 202111430870.9

(51) Int. Cl.
*F03H 1/00* (2006.01)
(52) U.S. Cl.
CPC ......... *F03H 1/0031* (2013.01); *F03H 1/0081* (2013.01)

(58) Field of Classification Search
CPC .............................. F03H 1/0031; F03H 1/0081
See application file for complete search history.

(56) References Cited

FOREIGN PATENT DOCUMENTS

| CN | 103790794 A | 5/2014 |
|---|---|---|
| CN | 206181518 U | 5/2017 |
| CN | 107044396 A | 8/2017 |
| CN | 107218187 A | 9/2017 |
| CN | 107795446 A | 3/2018 |
| CN | 109630368 A | 4/2019 |
| CN | 110856329 A | 2/2020 |

(Continued)

OTHER PUBLICATIONS

Boxberger "Current Advances in Optimization Regimes of Steady State Applied Field MPD thrusters" (Year: 2019).*

(Continued)

*Primary Examiner* — Ehud Gartenberg
*Assistant Examiner* — William L Breazeal

(57) ABSTRACT

The present disclosure provides a cooling structure of heat pipe for superconducting magneto plasma dynamic thruster having a cylindrical structure and includes a cathode, an intermediate connector and an anode. The cathode is arranged inside the intermediate connector, the anode is arranged outside the intermediate connector; the cathode is provided with a cathode cooling mechanism, and the anode is provided with an anode cooling mechanism. The cathode cooling mechanism includes a cathode heat pipe and a cathode heat dissipation fin. The anode heat pipe cooling mechanism includes an anode heat pipe and an anode heat dissipation fin.

7 Claims, 4 Drawing Sheets

(56) References Cited

FOREIGN PATENT DOCUMENTS

CN         112911778 A     6/2021
RU        2014111202 A     9/2015

OTHER PUBLICATIONS

Voronov "Magnetoplasmadynamic thruster with an applied field based on the second generation high-temperature superconductors" (Year: 2020).*

Ji "Integrated flat heatpipe with a porous wick for high heat flux electronic devices" (Year: 2017).*

Udit "A Study of High Temperature Heat Pipes and the Impact of Magnetic Field on the Flow of Liquid Metal" (Year: 2017).*

* cited by examiner

COOLING STRUCTURE OF HEAT PIPE FOR SUPERCONDUCTING MAGNETO PLASMA DYNAMIC THRUSTER

CROSS REFERENCE TO RELATED APPLICATIONS

The present application claims foreign priority of Chinese Patent Application No. 202111430870.9, filed on Nov. 29, 2021, the entire contents of which are hereby incorporated by reference in their entireties.

TECHNICAL FIELD

The present disclosure relates to the technical field of electric thruster, in particular to a cooling structure of a heat pipe for a superconducting magneto plasma dynamic thruster.

BACKGROUND

Electric propulsion is a kind of advanced propulsion method that uses electric energy to directly heat propellant or uses electromagnetic ionization acceleration propellant to obtain propulsion power. It has high specific impulse, thrust and efficiency, and has broad application prospects in space missions such as orbit control, deep space exploration and interstellar navigation of large spacecraft.

Superconducting magneto plasma dynamic thruster (MPDT) is a typical representative of electric propulsion technology, and is considered to be one of the best candidate propulsion solutions for deep space exploration because of its high specific impulse, large thrust, easy combination of high power supply to achieve high power, miniaturization and other technical characteristics.

In the process of work, the superconducting magneto plasma dynamic thruster mainly discharges through the current between the electrodes, so that the incoming gas working substance is ionized to produce plasma. The plasma is ejected at high speed under the action of additional electromagnetic fields and aerodynamic acceleration, and creates thrust. Because the MPDT will produce a high-temperature plasma generated internally at a large current of several hundred amperes when the power is large, the electrodes exposed to the plasma are prone to ablation, which seriously endangers the safety of the thruster. The use of traditional active water cooling device requires additional power unit is complex system and low safety. The use of heat pipe plus radiation to complete the passive heat dissipation mode, which does not need to use any power system, is safe and reliable, and will have a huge advantage in the deep cold space.

SUMMARY OF THE DISCLOSURE

The present disclosure provides cooling structure of heat pipe, the cooling structure could cooling the cathode and the anode of the superconducting magneto plasma dynamic thruster with a small heat dissipation area, which could ensure the stable and reliable work of the thruster, and extend the working time and service life of the thruster. To achieve the above object, the present disclosure provides the following technical solutions:

A cooling structure of heat pipe for superconducting magneto plasma dynamic thruster, having a cylindrical structure and including: a cathode, an intermediate connector and an anode. The cathode is arranged inside the intermediate connector, the anode is arranged outside the intermediate connector; the cathode is provided with a cathode cooling mechanism, and the anode is provided with an anode cooling mechanism. The cathode cooling mechanism includes a cathode heat pipe and a cathode heat dissipation fin, the cathode heat dissipation fin is arranged on an outer surface of the cathode, the cathode heat pipe comprises an evaporation section and a condensation section, and the evaporation section of the cathode heat pipe extends inside the cathode, and the condensation section of the cathode heat pipe is arranged on the cathode heat dissipation fin. The anode heat pipe cooling mechanism includes an anode heat pipe and an anode heat dissipation fin. The anode heat dissipation fin is arranged on an outer surface of the anode; the anode heat pipe comprises an evaporation section and a condensation section, and the evaporation section of the anode heat pipe extends inside the anode, and the condensation section of the anode heat pipe is arranged on the anode heat dissipation fin.

In some embodiments, the cathode is provided with a cathode propellant inlet, a plurality of cathode propellant channels that extend along an axial direction of the cathode are defined in the cathode, the cathode propellant inlet is connected with an inlet of a propellant chamber, an outlet of the propellant chamber is connected with one end of each of the plurality of cathode propellant channels, and the other end of each of the plurality of cathode propellant channels is connected with a plasma ionization chamber.

In some embodiments, the cathode is provided with a cathode coolant inlet, the cathode coolant inlet is connected with an inlet of a third coolant chamber through a cathode coolant channel, an outlet of the third coolant chamber is connected with one end of the evaporation section of the cathode heat pipe, and the other end of the evaporation section of the cathode heat pipe is connected with an inlet of a second coolant chamber, an outlet of the second coolant chamber is connected with one end of the condensation section of the cathode heat pipe, and the other end of the condensation section of the cathode heat pipe is connected with an inlet of a first coolant chamber, an outlet of the first coolant chamber is connected with the cathode coolant channel.

In some embodiments, the cathode coolant channel includes one cathode coolant channel, the number of the plurality of cathode propellant channels comprises six cathode propellant channels, and the one cathode coolant channel is located in a center of the six cathode propellant channels.

In some embodiments, the cathode heat pipe is made of a capillary loop heat pipe, the evaporation section of the cathode heat pipe is provided with a plurality of thin channels along the axial direction of the cathode, and a cathode liquid wick made of porous material is arranged inside the plurality of thin channels, the material of the cathode heat pipe is tungsten, and inner working substance of the cathode heat pipe is silver.

In some embodiments, the intermediate connector is made of insulating ceramic and has a cylindrical shape, an outer surface of the intermediate connector and an inner surface of the anode achieve radial positioning through clearance fit, and an inner surface of the intermediate connector and the outer surface of the cathode achieve axial positioning through a stepped shaft, and a front end of the intermediate connector is connected with a plasma injection port through an annular flow channel.

In some embodiments, the anode is provided with an anode propellant inlet, the anode propellant inlet is connected with one end of an anode propellant channel, and the other end of the anode propellant channel is connected with an inlet of the annular flow channel, an outlet of the annular flow channel is connected with an inlet of the plasma injection port, and an outlet of the plasma injection port is connected with the plasma ionization chamber.

In some embodiments, the anode is provided with an anode coolant inlet, the anode coolant inlet is connected with one end of an anode coolant channel, and the other end of the anode coolant channel is connected with one end of the evaporation section of the anode heat pipe, the other end of the evaporation section of the anode heat pipe is connected with one end of the condensation section of the anode heat pipe, and the other end of the condensation section of the anode heat pipe is connected with the anode coolant channel.

In some embodiments, the anode propellant inlet includes four anode propellant inlets, both the number of the annular flow channel and the number of opening of the plasma injection ports are eight, and the anode coolant inlet comprises one anode coolant inlet, the anode heat pipe comprises twelve anode heat pipes, and the anode coolant inlets are respectively connected with the twelve anode heat pipes.

In some embodiments, the anode heat pipe is made of a capillary loop heat pipe, and an anode liquid wick is arranged inside the anode heat pipe, the material of the anode heat pipe is copper, and inner working substance of the anode heat pipe is methanol or water.

Compared with the related art, the beneficial effects of the present disclosure are:

(1) The present disclosure provides a cooling structure of heat pipe for superconducting magneto plasma dynamic thruster. Compared with the traditional active cooling structure, additional power units are required, resulting in complex structures and low safety. This heat pipe cooling structure of the present disclosure does not require any power system, and has the characteristics of compact structure, safety and reliability. Use in cryogenic space has huge advantages.

(2) The cooling structure of heat pipe for superconducting magneto plasma dynamic thruster of the present disclosure, compared with the traditional water-cooled structure requiring a large amount of cooling water for cooling, the heat pipe cooling structure provided in the present disclosure only needs a small amount of coolant to circulate, which could save valuable resources for outer space vehicles.

(3) The cooling structure of heat pipe for superconducting magneto plasma dynamic thruster in the present disclosure has compact structure, since the cathode is a consumable, the cathode member of the present disclosure could be directly replaced by axial direction, which could make it easy to maintain.

In the figures: 1, condensation section of the anode heat pipe; 2, anode heat dissipation fin; 3, cathode heat dissipation fin; 4, cathode; 5, intermediate connector; 6, anode; 7, condensation section of the cathode heat pipe; 8, cathode propellant inlet; 9, cathode coolant inlet; 10, propellant chamber; 11, first coolant chamber; 12, second coolant chamber; 13, third coolant chamber; 14, cathode coolant channel; 15, cathode propellant channel; 16, cathode liquid wick; 17, anode coolant inlet; 18, anode propellant inlet; 19, anode propellant channel; 20, anode cathode liquid wick; 21, anode coolant channel; 22, plasma ionization chamber; 23, plasma injection port; 24, annular flow channel.

DETAILED DESCRIPTION

In order to make those skilled in the art better understand the solutions of the present disclosure, the technical solutions in the embodiments of the present disclosure will be clearly and completely described below with reference to the accompanying drawings in the embodiments of the present disclosure. Obviously, the described embodiments are only some embodiments of the present disclosure, not all embodiments. Based on the embodiments of the present disclosure, all other embodiments obtained by persons of ordinary skilled in the art without creative efforts shall fall within the protection scope of the present disclosure.

Figure 1:
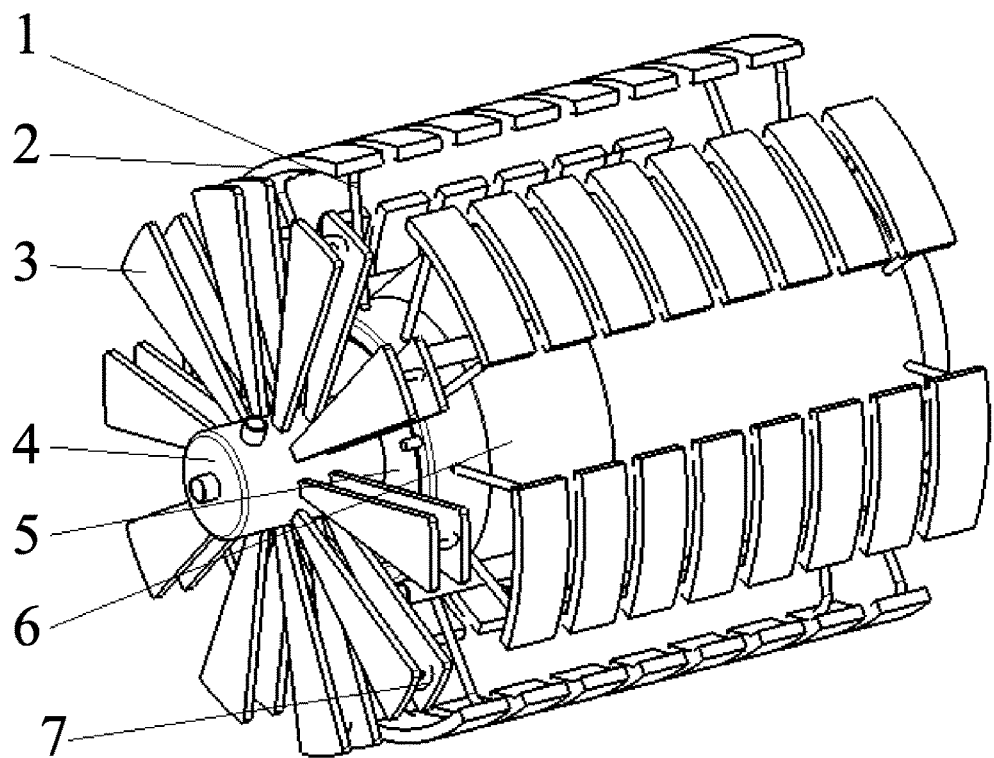
FIG. 1 is a schematic diagram of an overall structure of the superconducting magneto plasma dynamic thruster according to the present disclosure.
Figure 2:
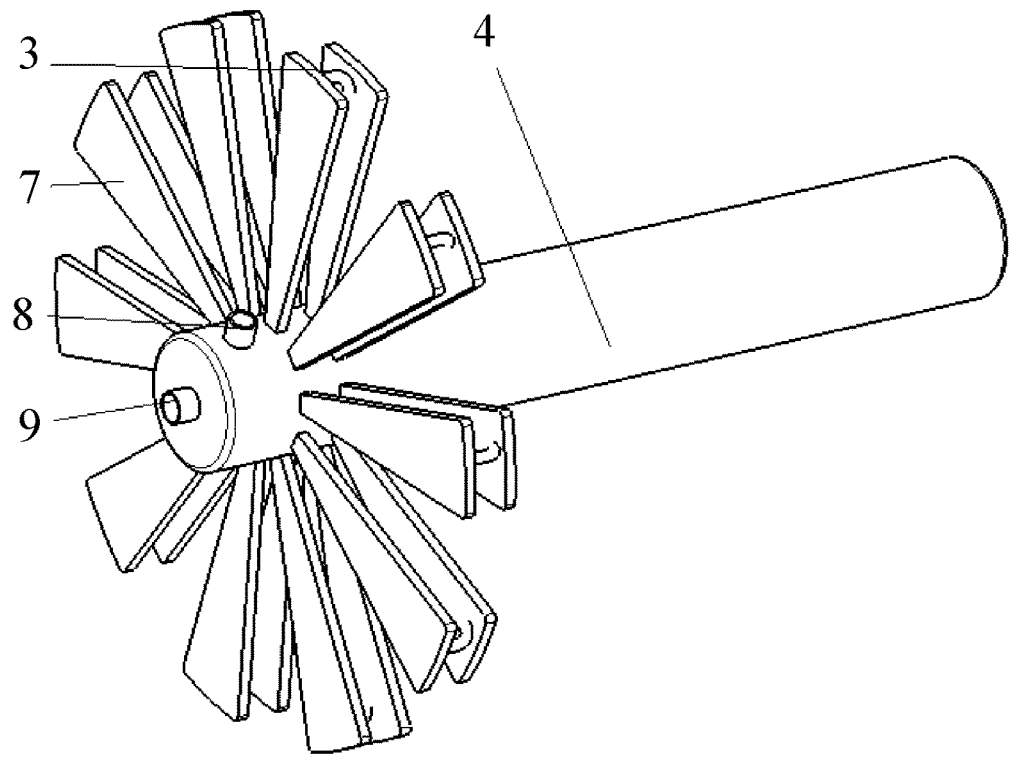
FIG. 2 is a schematic diagram of a cathode of the superconducting magneto plasma dynamic thruster according to the present disclosure.
Figure 3:
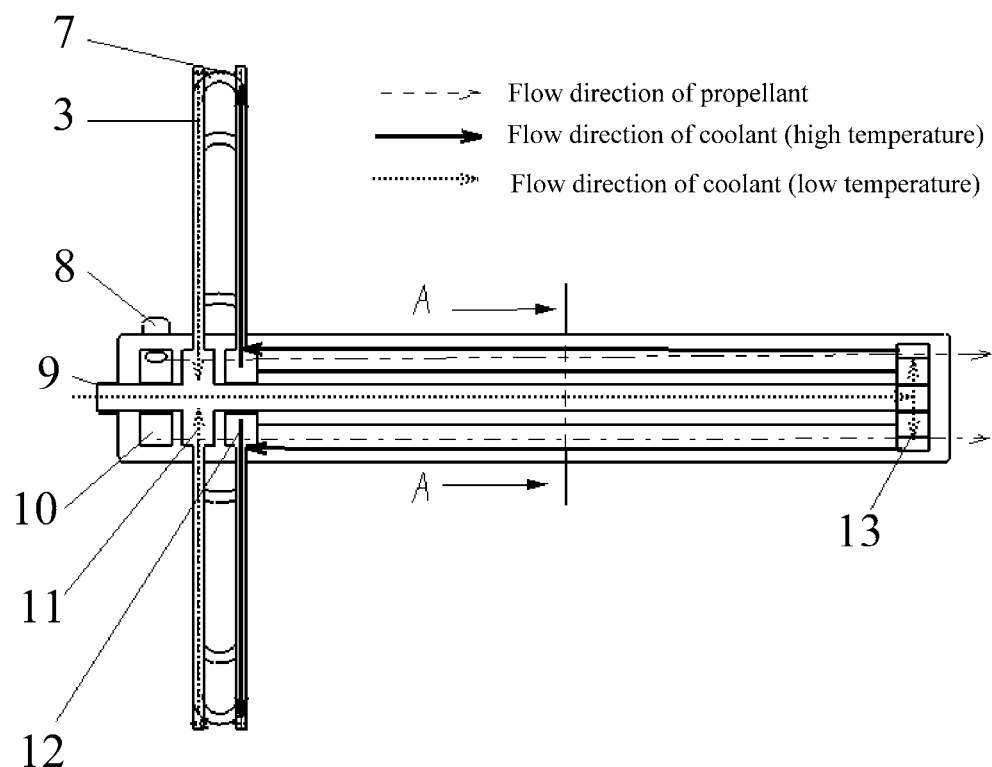
FIG. 3 is a schematic diagram of a flow direction of the cathode coolant and propellant of the superconducting magneto plasma dynamic thruster according to the present disclosure.
Figure 4:
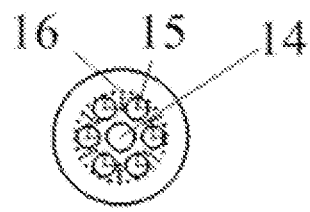
FIG. 4 is a cross sectional view along A-A in FIG. 3.
Figure 5:
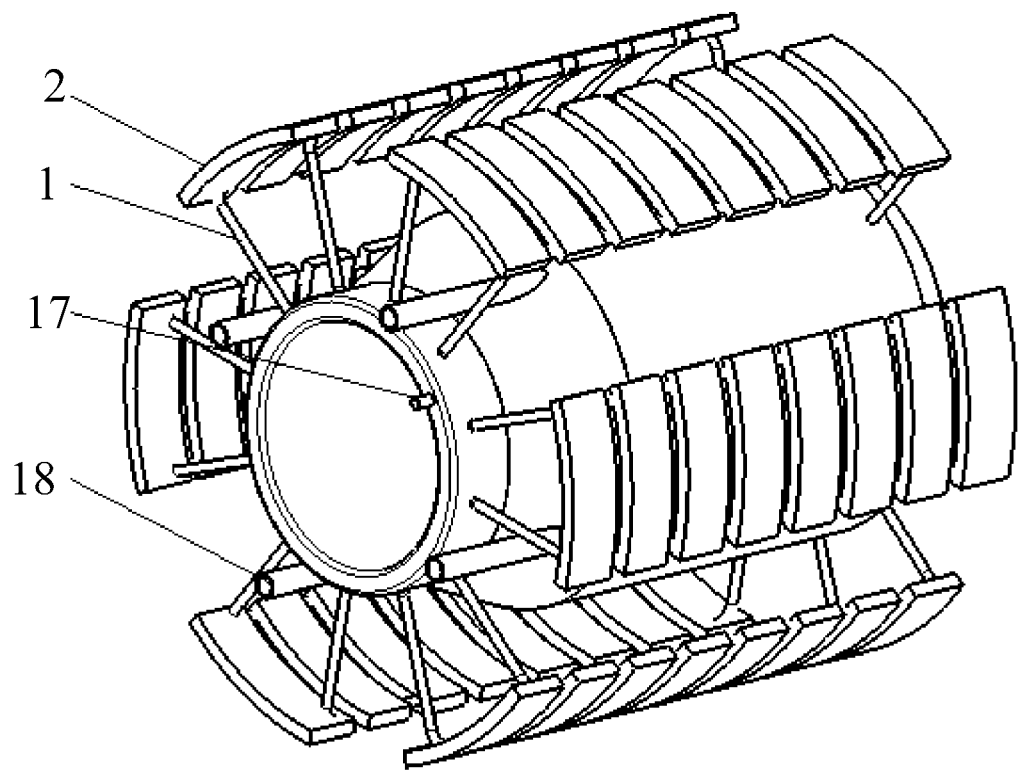
FIG. 5 is schematic diagram of an anode of the superconducting magneto plasma dynamic thruster according to the present disclosure.
Figure 6:
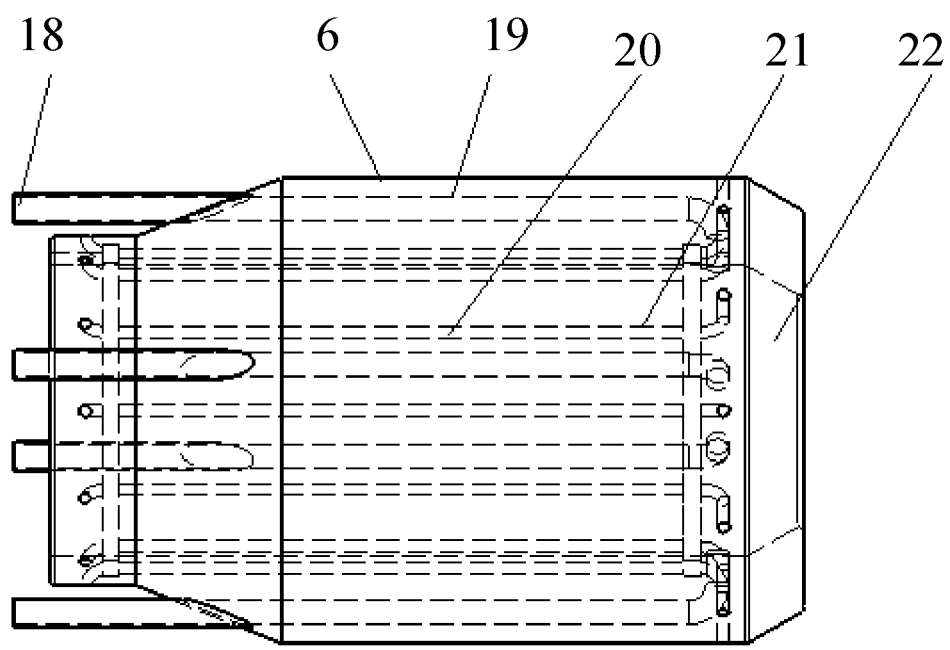
FIG. 6 is a schematic diagram of a flow direction of the anode coolant and propellant of the superconducting magneto plasma dynamic thruster according to the present disclosure.
Figure 7:
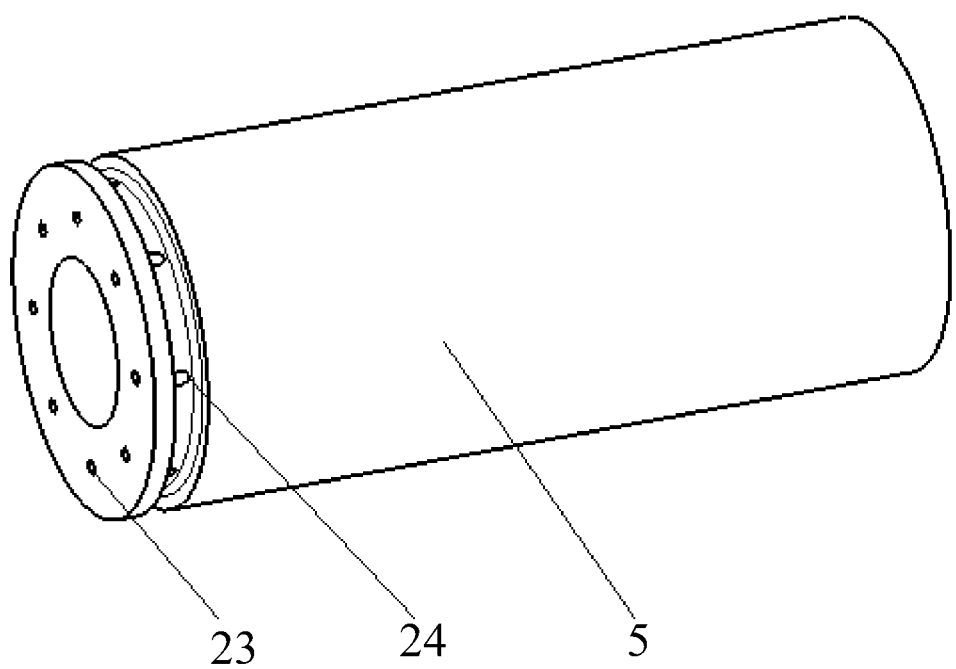
FIG. 7 is a schematic diagram of an intermediate connector.

Referring to FIGS. 1 to 6, a solution provided by the present disclosure is a cooling structure of a heat pipe for a superconducting magneto plasma dynamic thruster. The cooling structure of a heat pipe for a superconducting magneto plasma dynamic thruster has a cylindrical structure and includes a cathode 4, an intermediate connector 5 and an anode 6. The cathode 4 is arranged inside the intermediate connector 5, the anode 6 is arranged outside the intermediate connector 5. The cathode 4 is provided with a cathode cooling mechanism, and the anode 6 is provided with an anode cooling mechanism. The cathode cooling mechanism includes a cathode heat pipe and a cathode heat dissipation fin 3. The cathode heat dissipation fin 3 is arranged on an outer surface of the cathode 4. The cathode heat pipe includes an evaporation section and a condensation section 7. The evaporation section of the cathode heat pipe extends inside the cathode 4, and the condensation section 7 of the cathode heat pipe is arranged on the cathode heat dissipation fin 3. The anode heat pipe cooling mechanism includes an anode heat pipe and an anode heat dissipation fin 2. The anode heat dissipation fin 2 is arranged on an outer surface of the anode 6. The anode heat pipe includes an evaporation section and a condensation section, and the evaporation section of the anode heat pipe extends inside the anode 6, and the condensation section of the anode heat pipe is arranged on the anode heat dissipation fin 2.

In some embodiments, the cathode 4 is provided with a cathode propellant inlet 8. A plurality of cathode propellant channels 15 that extend along an axial direction of the cathode 4 are defined in the cathode 4. The cathode propellant inlet 8 is connected with an inlet of a propellant chamber 10. An outlet of the propellant chamber 10 is connected with one end of each cathode propellant channel 15, and the other end of each cathode propellant channel 15 is connected with a plasma ionization chamber 22.

Specifically, there are six cathode propellant channels 15 in the cathode 4. The propellant flows from the cathode propellant inlet 8 into the propellant chamber 10, and then flows into the plasma ionization chamber 22 through the six cathode propellant channels 15, and is ionized and jetted to generate propulsion.

In some embodiments, the cathode 4 is provided with a cathode coolant inlet 9. The cathode coolant inlet 9 is connected with an inlet of a third coolant chamber 13 through a cathode coolant channel 14. An outlet of the third coolant chamber 13 is connected with one end of the evaporation section of the cathode heat pipe, and the other end of the evaporation section of the cathode heat pipe is connected with an inlet of a second coolant chamber 12. An outlet of the second coolant chamber 12 is connected with one end of the condensation section 7 of the cathode heat pipe, and the other end of the condensation section 7 of the cathode heat pipe is connected with an inlet of a first coolant chamber 11, an outlet of the first coolant chamber 11 is connected with the cathode coolant channel 14.

In some embodiments, the number of cathode coolant channels 14 is one, the cathode propellant channel 15 is six, and the one cathode coolant channel 14 is disposed in a center of the six cathode propellant channels 15.

In some embodiments, the cathode heat pipe is made of a capillary loop heat pipe, the evaporation section of the cathode heat pipe is provided with a plurality of thin channels along the axial direction of the cathode, and a cathode liquid wick 16 made of porous material is arranged inside the plurality of thin channels, the material of the cathode heat pipe is tungsten, and inner working substance of the cathode heat pipe is silver.

Specifically, the cathode heat pipe is the capillary loop heat pipe. A plurality of thin channels are provided along the axial direction of the cathode as the evaporation section of the cathode heat pipe. There are a cathode liquid wick 16 arranged in the plurality of thin channels. The cathode liquid wick 16 is made of porous material. The cathode liquid wick 16 sucks the liquid through capillary action, and the liquid is evaporated when flows in the evaporation section of the cathode heat pipe, and the heat generated from the cathode 4 is taken away in the evaporation section of the cathode heat pipe. There is a coolant pipe on the cathode 4. The coolant flows from the cathode coolant inlet 9, and reaches the third coolant chamber 13. After the cathode liquid wick 16 arranged in the evaporation section of cathode heat pipe absorbs a large amount of heat generated by the cathode 4, the coolant reaches the second coolant chamber 12. Then the coolant flows to the condensation section 7 of the cathode heat pipe and releases the heat brought by the cathode 4 to the cathode heat dissipation fin 3. The heat radiates out from the cathode heat dissipation fin 3 to the outer space. The condensation section 7 of the cathode heat pipe radiates to the cryogenic space through a large area of fins. The coolant liquefies and flows into the first coolant chamber 11, and a cooling cycle is formed. Due to the relatively high temperature of the cathode 4, the material of the cathode heat pipe is tungsten, and the working medium in the cathode heat pipe can be selected as silver.

In some embodiments, the intermediate connector 5 is made of insulating ceramic and has a cylindrical shape. An outer surface of the intermediate connector 5 and an inner surface of the anode 6 achieve radial positioning through clearance fit. An inner surface of the intermediate connector 5 and the outer surface of the cathode 4 achieve axial positioning through a stepped shaft. A front end of the intermediate connector 5 is connected with a plasma injection port 23 through an annular flow channel 24.

In some embodiments, the anode 6 is provided with an anode propellant inlet 18. The anode propellant inlet 18 is connected with one end of an anode propellant channel 19, and the other end of the anode propellant channel 19 is connected with an inlet of the annular flow channel 24. An outlet of the annular flow channel 24 is connected with an inlet of the plasma injection port 23. An outlet of the plasma injection port 23 is connected with the plasma ionization chamber 22.

Specifically, the anode propellant flows into the anode propellant channel 19 from the anode propellant inlet 18, flows into the annular flow channel 24 of the intermediate connector 5, is jetted into the plasma ionization chamber 22 by eight groups of the plasma injection ports 23, and is ionized and jetted to generate propulsion, so as to push the thruster to move.

In some embodiments, the anode 6 is provided with an anode coolant inlet 17. The anode coolant inlet 17 is connected with one end of an anode coolant channel 21, and the other end of the anode coolant channel 21 is connected with one end of the evaporation section of the anode heat pipe, the other end of the evaporation section of the anode heat pipe is connected with one end of the condensation section of the anode heat pipe 1, and the other end of the condensation section of the anode heat pipe 1 is connected with the anode coolant channel 21.

In some embodiments, the anode propellant inlet 18 includes four anode propellant inlets 18. Both the number of the annular flow channel 24 and the number of opening of the plasma injection ports 23 are eight. The number of the anode coolant inlet 17 is one. The number of the anode heat pipes is twelve. The anode coolant inlets 17 are respectively connected with the twelve anode heat pipes.

In some embodiments, the anode heat pipe is made of a capillary loop heat pipe, and an anode liquid wick is arranged inside the anode heat pipe, the material of the anode heat pipe is copper, and inner working substance of the anode heat pipe is methanol or water.

Specifically, the anode 6 uses twelve anode heat pipes to realize uniform cooling of the anode 6. The anode heat pipe mainly includes an evaporation section and a condensation section. The evaporation section of the anode heat pipe is inserted into the anode 6. The liquid in the capillary of the evaporation section absorbs a large amount of heat conducted from the anode 6 and becomes steam, which flows to the condensation section under pressure. After the heat is released in the condensation section, the liquid is then flowed back to the evaporation section by capillary action of the porous material, and so on. The condensation section heat pipe is inserted into the fin, and radiates heat to the external cryogenic space through a large area of fins. More specifically, the coolant flows into the anode coolant channel 21 through the anode coolant inlet 17, the channel contains an anode liquid wick 20, the coolant absorbs a large amount of heat generated by the anode and reaches the condensation section of the anode heat pipe 1 and release the heat brought by the anode 6 to the anode heat dissipation fin 2, and then the heat radiates out of the outer space by the fin. After the coolant liquefies, it enters the anode coolant channel 21 again and forms a cycle. The material of the anode is copper. The working medium in the heat pipe could be methanol or water.

Compared with the related art, the beneficial effects of the present disclosure are:

(1) The present disclosure provides a cooling structure of heat pipe for superconducting magneto plasma dynamic thruster. Compared with the traditional active cooling structure, additional power units are required, resulting in complex structures and low safety. This heat pipe cooling structure of the present disclosure does not require any power system, and has the characteristics of compact structure, safety and reliability. Use in cryogenic space has huge advantages.

(2) The cooling structure of heat pipe for superconducting magneto plasma dynamic thruster of the present disclosure, compared with the traditional water-cooled structure requiring a large amount of cooling water for cooling, the heat pipe cooling structure provided in the present disclosure only needs a small amount of coolant to circulate, which could save valuable resources for outer space vehicles.

(3) The cooling structure of heat pipe for superconducting magneto plasma dynamic thruster in the present disclosure has compact structure, since the cathode is a consumable, the cathode member of the present disclosure could be directly replaced by axial direction, which could make it easy to maintain.

The description above is only some specific embodiments of the present disclosure, however, the technical features of the present disclosure are not limited to this. Any simple change, equivalent replacement or modification based on the present application to achieve basically the same technical effect is covered by the protection scope of the present application.

What is claimed is:

1. A cooling structure of a heat pipe for a superconducting magneto plasma dynamic thruster, having a cylindrical structure and comprising: a cathode, an intermediate connector and an anode;

wherein the cathode is arranged inside the intermediate connector, the anode is arranged outside the intermediate connector; the cathode is provided with a cathode cooling mechanism, and the anode is provided with an anode cooling mechanism;

wherein the cathode cooling mechanism comprises a cathode heat pipe and a cathode heat dissipation fin, the cathode heat dissipation fin is arranged on an outer surface of the cathode, the cathode heat pipe comprises a cathode evaporation section and a cathode condensation section, and the cathode evaporation section of the cathode heat pipe extends inside the cathode, and the cathode condensation section of the cathode heat pipe is arranged on the cathode heat dissipation fin;

the anode heat pipe cooling mechanism comprises an anode heat pipe and an anode heat dissipation fin; the anode heat dissipation fin is arranged on an outer surface of the anode; the anode heat pipe comprises an anode evaporation section and an anode condensation section, and the anode evaporation section of the anode heat pipe extends inside the anode, and the anode condensation section of the anode heat pipe is arranged on the anode heat dissipation fin;

wherein the cathode is provided with a cathode propellant inlet, a plurality of cathode propellant channels that extend along an axial direction of the cathode are defined in the cathode, the cathode propellant inlet is connected with an inlet of a propellant chamber, an outlet of the propellant chamber is connected with one end of each cathode propellant channel of the plurality of cathode propellant channels, and an other end of each cathode propellant channel of the plurality of cathode propellant channels is connected with a plasma ionization chamber;

wherein the cathode is provided with a cathode coolant inlet, the cathode coolant inlet is connected with an inlet of a third coolant chamber through a cathode coolant channel, an outlet of the third coolant chamber is connected with one end of the evaporation section of the cathode heat pipe, and an other end of the evaporation section of the cathode heat pipe is connected with an inlet of a second coolant chamber, an outlet of the second coolant chamber is connected with one end of the condensation section of the cathode heat pipe, and an other end of the condensation section of the cathode heat pipe is connected with an inlet of a first coolant chamber, an outlet of the first coolant chamber is connected with the cathode coolant channel;

wherein the cathode coolant channel comprises one cathode coolant channel, the number of the plurality of cathode propellant channels comprises six cathode propellant channels, and the one cathode coolant channel is located in a center of the six cathode propellant channels.

2. The cooling structure of the heat pipe for the superconducting magneto plasma dynamic thruster as claimed in claim 1, wherein the cathode heat pipe is made of a capillary loop heat pipe, the evaporation section of the cathode heat pipe is provided with a plurality of thin channels along an axial direction of the cathode, and a cathode liquid wick made of porous material is arranged inside the plurality of thin channels, the material of the cathode heat pipe is tungsten, and an inner working substance of the cathode heat pipe is silver.

3. The cooling structure of the heat pipe for the superconducting magneto plasma dynamic thruster as claimed in claim 1, wherein the intermediate connector is made of an insulating ceramic and has a cylindrical shape, an outer surface of the intermediate connector and an inner surface of the anode achieve radial positioning through a clearance fit, and an inner surface of the intermediate connector and the outer surface of the cathode achieve axial positioning through a stepped shaft, and a front end of the intermediate connector is connected with a plasma injection port through an annular flow channel.

4. The cooling structure of the heat pipe for the superconducting magneto plasma dynamic thruster as claimed in claim 1, wherein the anode is provided with an anode propellant inlet, the anode propellant inlet is connected with one end of an anode propellant channel, and an other end of the anode propellant channel is connected with an inlet of the annular flow channel, an outlet of the annular flow channel is connected with an inlet of the plasma injection port, and an outlet of the plasma injection port is connected with the plasma ionization chamber.

5. The cooling structure of the heat pipe for the superconducting magneto plasma dynamic thruster as claimed in claim 4, wherein the anode is provided with an anode coolant inlet, the anode coolant inlet is connected with one end of an anode coolant channel, and an other end of the anode coolant channel is connected with one end of the evaporation section of the anode heat pipe, an other end of the evaporation section of the anode heat pipe is connected with one end of the condensation section of the anode heat pipe, and an other end of the condensation section of the anode heat pipe is connected with the anode coolant channel.

6. The cooling structure of the heat pipe for the superconducting magneto plasma dynamic thruster as claimed in claim 4, wherein the anode propellant inlet comprises four anode propellant inlets, both the number of the annular flow channel and the number of opening of the plasma injection ports are eight, and the anode coolant inlet comprises one anode coolant inlet, the anode heat pipe comprises twelve anode heat pipes, and the anode coolant inlets are respectively connected with the twelve anode heat pipes.

7. The cooling structure of the heat pipe for the superconducting magneto plasma dynamic thruster as claimed in claim 6, wherein the anode heat pipe is made of a capillary loop heat pipe, and an anode liquid wick is arranged inside the anode heat pipe, the material of the anode heat pipe is copper, and an inner working substance of the anode heat pipe is methanol or water.

\* \* \* \* \*